United States Patent [19]

Shedlo

[11] Patent Number: 5,603,085
[45] Date of Patent: Feb. 11, 1997

[54] METHOD OF ALLOCATING COMMUNICATION RESOURCES IN A COMMUNICATION SYSTEM

[75] Inventor: Allan Shedlo, New York, N.Y.

[73] Assignee: Motorola, Inc., Schaumburg, Ill.

[21] Appl. No.: 611,435

[22] Filed: Mar. 4, 1996

Related U.S. Application Data

[63] Continuation of Ser. No. 322,046, Oct. 12, 1994, abandoned.

[51] Int. Cl.$^6$ .................................................. H04B 15/00
[52] U.S. Cl. ........................ 455/33.1; 455/62; 455/63; 455/67.1
[58] Field of Search ........................... 455/33.1, 62, 63, 455/67.1, 67.6; 379/22, 27, 34, 59

[56] References Cited

U.S. PATENT DOCUMENTS

| | | | |
|---|---|---|---|
| 5,289,526 | 2/1994 | Chymyck et al. | 455/67.1 |
| 5,293,640 | 3/1994 | Gunmar et al. | 455/62 |
| 5,307,510 | 4/1994 | Gunmar et al. | 455/67.1 |
| 5,361,402 | 11/1994 | Grube et al. | 455/67.1 |
| 5,398,276 | 3/1995 | Lemke et al. | 379/34 |
| 5,425,076 | 6/1995 | Knippelmier | 455/67.1 |
| 5,442,804 | 8/1995 | Gunmar et al. | 455/62 |

OTHER PUBLICATIONS

"PICAM: A PC Based Cellular Network Planning Software Package", Bühler et al, IEEE 1991, pp. 643–646.
"Propagation Modelling for Cellular RF System Planning", Zollman, 1988 IEE Colloquium No. 71 Terrestrial Radio Spectrum Management Tools, pp. 7/2–7/3.
"Forward Cell Planning Networks", Esposito et al, IEEE, 1994, pp. 1864–1868.
Planet Brochure, Mobile Systems International, Oakbrook Terrace, Illinois, Date Unknown.
Comsearch Brochure, Comsearch, Reston, Virginia, Date Unknown.

*Primary Examiner*—Andrew Faile
*Attorney, Agent, or Firm*—Heather L. Creps

[57] ABSTRACT

The present invention provides a method of allocating communication resources in a communication system. The method includes retrieving from the communication system the present communication system resource allocation (402); identifying for a tuning cell allocated communication resources which do not satisfy the allocation criteria (410); identifying candidate communication resources within the communication system which satisfy the allocation criteria (416); allocating the candidate communication resources to the cell (424); repeating these steps for each cell marked for retuning (404) and downloading the new communication system resource allocation to the communication system (406).

7 Claims, 3 Drawing Sheets

METHOD OF ALLOCATING COMMUNICATION RESOURCES IN A COMMUNICATION SYSTEM

This application is a continuation of application Ser. No. 08/322,046 filed Oct. 12, 1994, now abandoned.

FIELD OF THE INVENTION

The present invention relates generally to communication systems, and more particularly, to a method of allocating communication resources in a communication system.

BACKGROUND OF THE INVENTION

Communication systems, and particularly cellular communication systems, are well known. Cellular communication systems, as is known, consist of individual cell sites, each equipped to communicate with mobile communication units located within the cell site. Communication in a cell site is conducted over a communication resource, often referred to as a communication channel, which may consist of a pair of radio frequencies which are used by the mobile communication unit to transmit and receive information with the cell site transceiver. Several of the communication resources may be dedicated to particular functions such as two-way transmission of control information. The total number of communication resources, however, are limited.

In planning cellular radiotelephone systems there is a never ending tension among maximizing system capacity, providing Carrier-to-Interference (C/I) immunity, meeting cell-to-cell hand-off topography, and etc. This is due primarily to the scarce radio spectrum available. To increase capacity, the limited number of communication resources are repeatedly reused at different cell sites throughout the cellular communication system. However, higher resource reuse adversely affects C/I and may not be possible because of hand-off criteria. Thus the system operator is left with the very difficult task of allocating resources to the cells in the most efficient way possible. This task, however, is very labor intensive and iterative at best. Once resources are allocated within a system, tuning of the system to reduce the effects of interfering resources or adding/removing resources from cells to balance capacity is often not performed even though system performance suggests that it should be.

Therefore, a need exists for a method of allocating and reallocating communication resources to cells of a communication system which accounts for the various criteria which must be satisfied within the system without consuming an inordinate amount of time and resources.

DETAILED DESCRIPTION OF THE PREFERRED EMBODIMENT(S)

The present invention is directed to a method of allocating resources within a cellular communication system. The method of the present invention is equally applicable to performing an initial resource allocation of the cellular communication system as to "tuning" or reallocating communication resources within an existing system.

Figure 1:
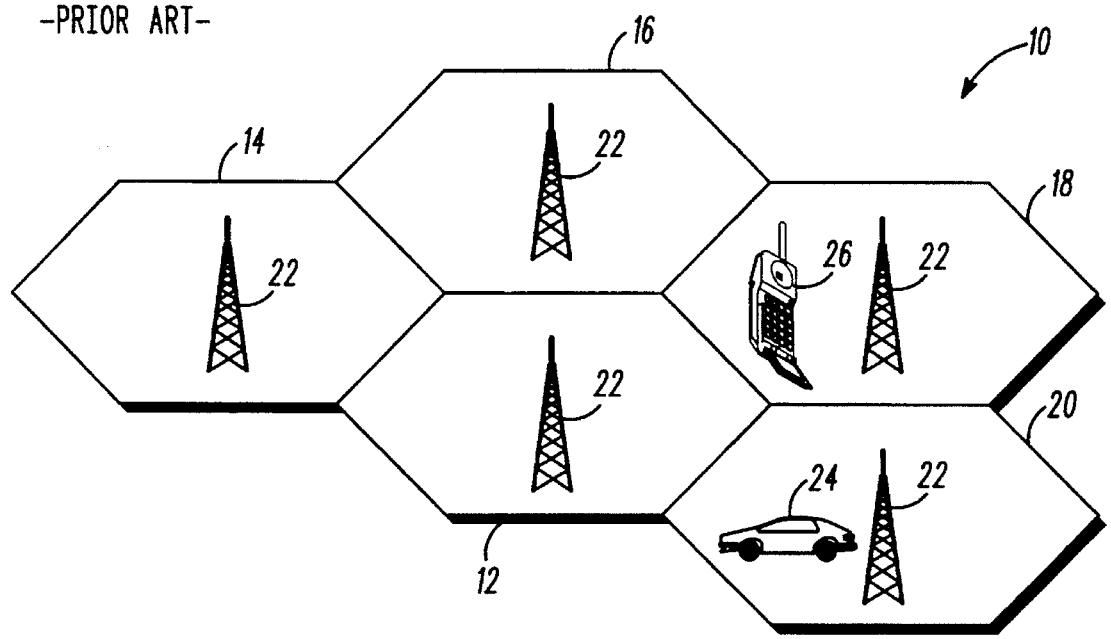
FIG. 1 is a diagram illustrating a typical cellular communication system.

With reference to FIG. 1, a typical cellular communication system 10 is shown to include a plurality of cells 12–20 each cell being serviced by a base station 22, for providing communication services to mobile communication units 24, 26 operating within a cell. The communication services between the base station and the mobile communication unit are provided over a communication resource of a plurality of communication resources allocated to the cell. Communication between the mobile communication units 24, 26 and the base stations 22 can occur in any number of formats such as, for example, frequency division multiple access (FDMA) or time division multiple access (TDMA), as is known. Hence, it should be understood that the communication resource may consist of a communication channel having either a single radio frequency or a pair of radio frequencies as is required for allowing duplex communication between the mobile communication units and the base stations.

Figure 2:
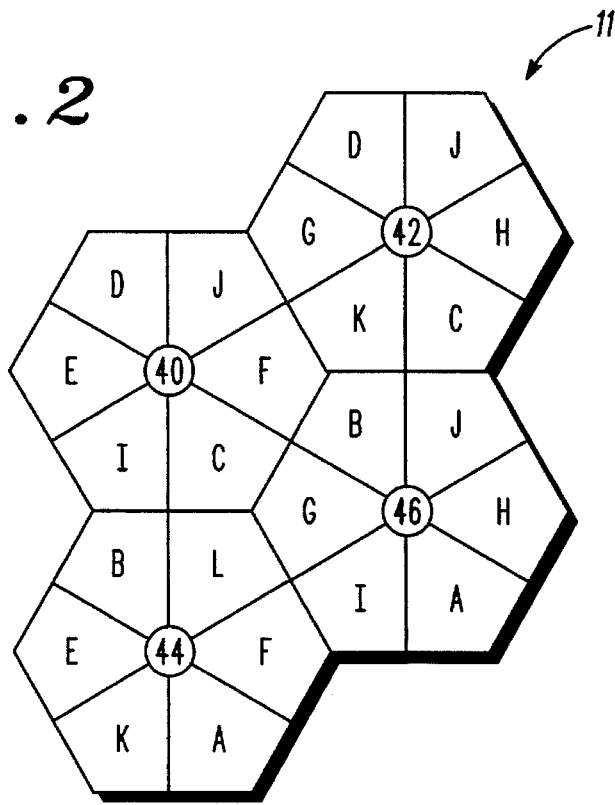
FIG. 2 is a diagram illustrating a sectored cellular communication system with resource assignments.

FIG. 2 illustrates a sectored cell communication system 11. In FIG. 2, cell sites 40, 42, 44, and 46 each are divided into sectors. Each of the sectors are then allocated communication resources (A–L) for servicing mobile communication units operating within the sector. The communication resources (A–L) may consist of groups of communication channels, but may also be individual communication channels. Throughout this specification the term cell is used to refer to a cell, sector, coverage area, or the like indicating a region in which cellular communication services are provided. The operator, in making the resource allocation, must consider, for example: Carrier-to-Interferer (C/I) ratios between all cells, the number of required resources for each cell, the number of channel groups (where the communication resources are allocated as groups of communication channels to a cell), minimum channel spacing and hand-off topology.

Figure 3:
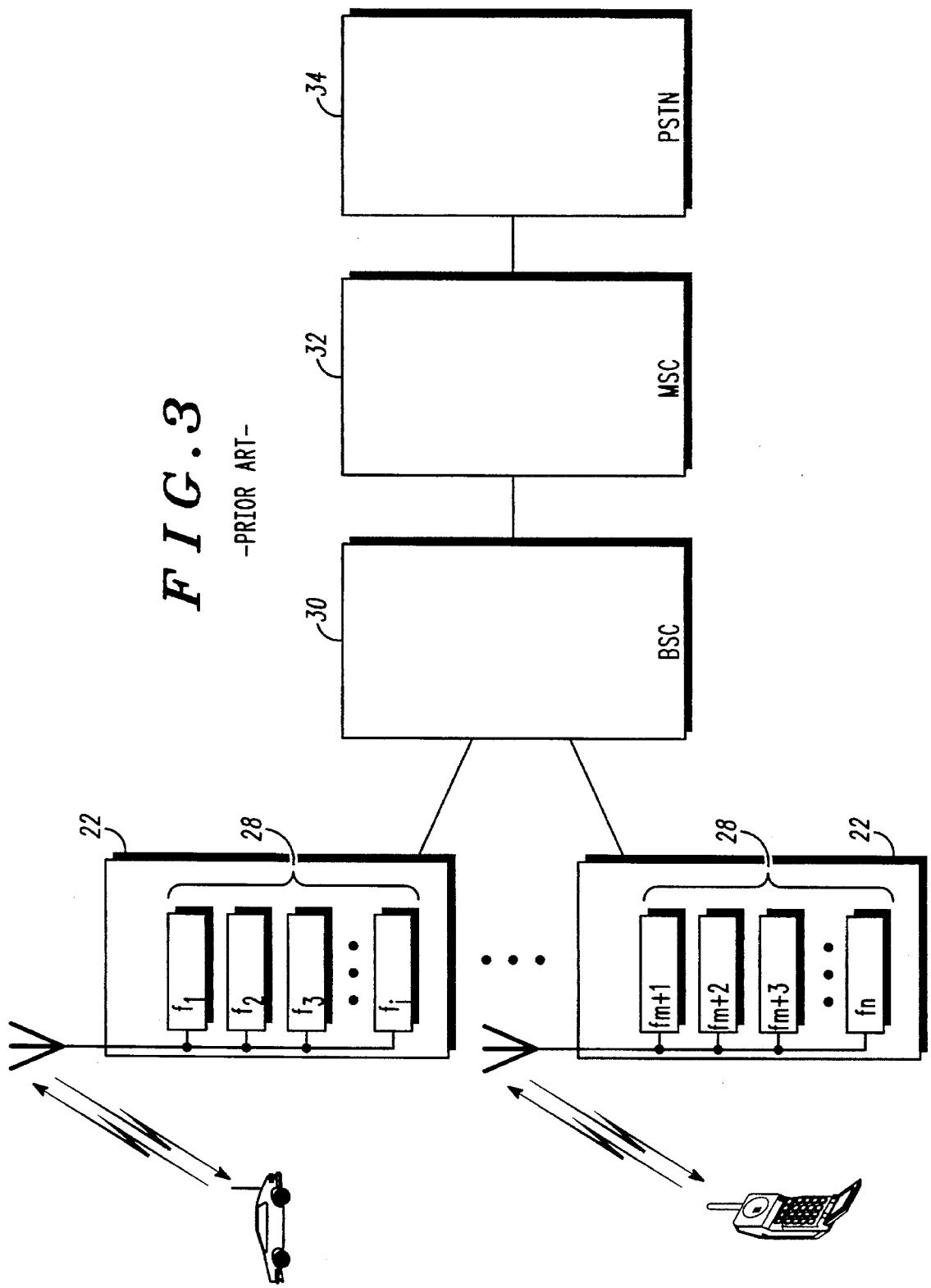
FIG. 3 is a block diagram illustrating a typical communication system.

FIG. 3 further illustrates elements of the communication system 10. As can be seen, each base station 22 includes a plurality of transceivers 28 which operate to communicate on an allocated communication resource with a mobile communication unit 24 or 26. Base stations 22 may also include dedicated transceivers 30 and 32 for providing, for example, control and signaling information over dedicated resources to mobile communication units operating within the cell. Each of the base stations are linked to a base station controller 34. When a mobile communication unit requests service, i.e., initiates a call or is paged to receive a call within a cell, the base station controller 34 directs the appropriate base station to assign a communication resource from a plurality of communication resources allocated to the base station for establishing communications with the mobile communication unit.

The base station controller also the directs hand-off of a mobile communication unit from a first cell to a hand-off target cell when appropriate. In such a case, when hand-off is necessary, the base station controller will direct the hand-off target cell base station to assign a communication resource and further directs the first base station to instruct the mobile to tune from the communication resource assigned by the first base station to the communication resource assigned by the target hand-off cell base station. As will be appreciated from the foregoing, in establishing the communication resource allocation, interfering communication resources should not be assigned to cells between which mobile communication units are likely to be handed off. This prevents assignment of an interfering resource by the hand-off target cell base station and the potential loss of the call due to interference.

The base station controller 34 is also in communication with a mobile switching center 36. The mobile switching center acts to receive messages from the base station controller and directs these messages to either the public switched telephone network (PSTN) 38 or to a base station controller such that communication may be established between the mobile communication unit and a land line telephone customer or another mobile communication unit, respectively.

Figure 4:
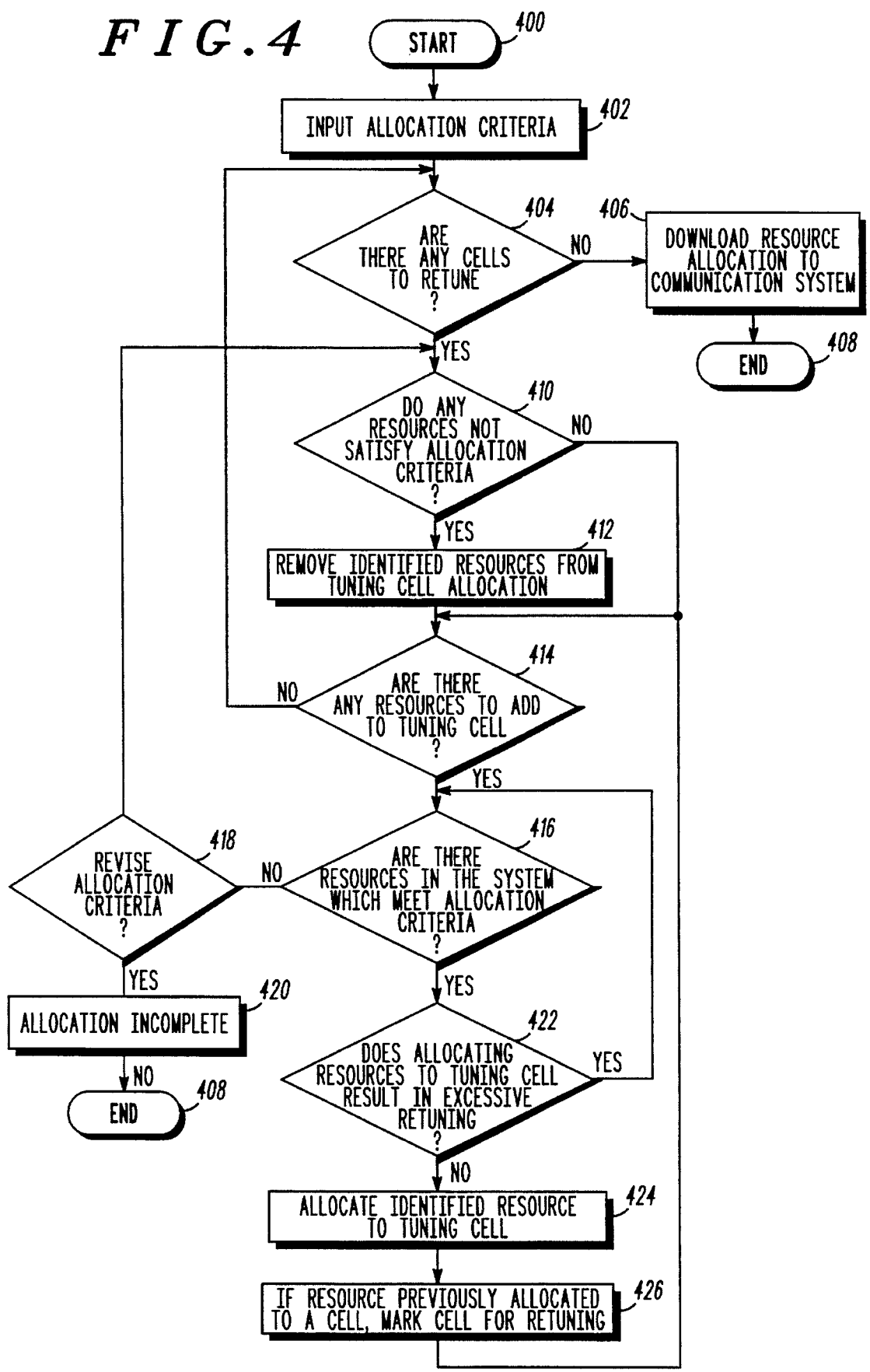
FIG. 4 is a flow chart illustrating a method of allocating resources within a communication system in accordance with a preferred embodiment of the present invention.

With reference to FIG. 4, a method of allocating communication resources in a cellular communication system according to a preferred embodiment of the present invention is shown. The method enters at bubble 400 and proceeds to block 402 where the allocation criteria is inputted. In the case of system retuning, the existing resource allocation is obtained from the communication system. If it is an initial resource allocation, the communication resources may be arbitrarily assigned to cells to establish an initial resource allocation. Also, the resource allocation criteria is inputted. This criteria includes the channel grouping requirements if communication channels are to be assigned in groups, the C/I ratios for each of the cells which is produced from actual measurements or from simulated data, the minimum channel spacing which is the minimum number of channels between any two channels allocated to a cell and the hand-off topology which identifies cells which are hand-off candidates and other criteria established by the system operator for resource allocation. An additional piece of information required is the cells to have resources reallocated (i.e. the "tuning" cells) as well as the number of resources in the cell to reallocate.

With the foregoing information, the method proceeds to diamond 404 where the method determines if there are any cells to be retuned. A cell is retuned if the resource allocation for the cell is changed. If there are no cells to retune, then the resource allocation is completed and is downloaded to the communication system at block 406 and the method ends at bubble 408. Otherwise, the method proceeds to diamond 410.

At diamond 410, the resources allocated to the tuning cell are checked and it is determined if any of the resources allocated to the cell does not meet the allocation criteria. If a resource does not meet the allocation criteria, it is removed from the cells resource allocation at block 412 and the method proceeds to diamond 414. Likewise, if no resources were identified at diamond 410, the method proceeds to diamond 414.

At diamond 414 the resource allocation for the cell is analyzed to determine if any resources are to be added to the cell. This will occur if the system operator has decided to add additional resources to a cell or if allocated resources were removed from the cell at block 412. If there are no resources to add to the cell, the method returns to diamond 410 to see if there are other cells to retune. Otherwise, there are resources to add to the cell and the method proceeds to block 416.

At block 416, the method analyzes resources available within the communication system, e.g., non-allocated resources or resources allocated to other cells of the communication system, to identify candidate resources which meet the allocation criteria for the tuning cell. If no such candidate resources can be identified, the method provides for revising the allocation criteria at diamond 418. That is, at times it is desirable to slowly degrade the allocation criteria such that more resources may be allocated to a cell than would otherwise be allowed. At other times, modification of the allocation criteria are prohibited. If modification of the allocation criteria is allowed at diamond 418, the allocation criteria are modified. Otherwise, the allocation is incomplete as resources meeting the criteria can not be identified and assigned to the tuning cell, block 420.

Typical modifications to allocation criteria include allowing higher levels of C/I, reducing the minimum channel spacing, or splitting channel groups. In the preferred embodiment, the degradation would proceed by a preset schedule whereby various criteria are degraded to a point at which time other criteria is degraded until a minimum is reached. If the allocation criteria are degraded to the minimum level and resources still can not be identified, the allocation is determined to be incomplete, block 420.

If candidate resources are identified at diamond 416, these resources are analyzed to determine if allocating the resource to the tuning cell results in excessive retuning of the other system cells, diamond 422. Each time a resource allocated to another cell is allocated to the tuning cell, the source cell is marked for retuning. It is desirable, however, to keep the number of cells which have to be retuned to a minimum. If excessive retuning would result from allocating the resource to the tuning cell, the method instead loops back to diamond 416 to identify other resources which satisfy the criteria. It should be noted that the excessive retuning threshold can also be modified as part of the modifying the allocation criteria at diamond 418.

If allocating the resource to the tuning cell does not result in excessive system retuning, the cell is allocated to the tuning cell, block 424. If the resource was previously allocated to another cell in the system, that cell is marked for retuning, block 426. The method then returns to determine if more resources are to be added to the tuning cell, diamond 414.

The present invention provides a method for allocating resources in a communication system which provides for enhanced resource allocation (i.e., increased system capacity) with enhanced performance (e.g., reduced interference). Moreover, the method provides for initial resource allocation as well as periodic system retuning for enhanced system operation and efficiency. It will be readily appreciated by one of ordinary skill in the art, however, that its teachings have application beyond the preferred embodiments described herein.

We claim:

1. In a cellular communication system operating in real time, a method of allocating communication resources, the method comprising the steps of:

a) retrieving from a base station controller associated with the communication system a communication system resource allocation;

b) identifying within a first cell of the communication system an allocated communication resource which does not satisfy an allocation criteria;

c) removing the allocated communication resource from the first cell;

d) identifying a candidate communication resource within the communication system which satisfies the allocation criteria;

e) determining whether allocating the candidate communication resource results in excessive retuning of a second cell;

f) based on the determination, allocating the candidate communication resource to the first cell; and g) automatically and reiteratively downloading the communication system resource allocation to the communication system during operation of the communication system.

2. The method of claim 1 further comprising the step of repeating steps b–f until a predetermined number of communication resources are allocated to the first cell.

3. The method of claim 1 wherein the step of identifying the candidate communication resource within the communication system comprises identifying the candidate communication resource from communication resources allocated to a third cell of the communication system.

4. The method of claim 3 further comprising the step of performing steps b–f for a third cell.

5. The method of claim 3 further comprising the step of identifying an additional communication resource if allocating the candidate communication resource results in excessive retuning of the second cell.

6. The method of claim 1 wherein the allocation criteria includes at least one criteria from the group consisting of:

carrier to interferer ratio, required number of communication resources per coverage area, minimum communication channel spacing between coverage areas, hand-off topology between coverage areas and minimum retuning of neighboring coverage areas.

7. The method of claim 2, further comprising the step of revising the allocation criteria if the predetermined number of communication resources is not allocated to the first cell.

* * * * *